United States Patent

[11] 3,611,118

| [72] | Inventor | William E. Youngblood<br>Houston, Tex. |
|---|---|---|
| [21] | Appl. No. | 796,689 |
| [22] | Filed | Feb. 5, 1969 |
| [45] | Patented | Oct. 5, 1971 |
| [73] | Assignee | Schlumberger Technology Corporation<br>New York, N.Y.<br>Continuation-in-part of application Ser. No.<br>534,509, Mar. 15, 1966, now abandoned. |

[54] MUD FILTRATE NUCLEAR MAGNETIC ANALYSIS
1 Claim, 8 Drawing Figs.

| [52] | U.S. Cl. | 324/0.5 |
|---|---|---|
| [51] | Int. Cl. | G01n 27/78 |
| [50] | Field of Search | 324/0.5 |

[56] References Cited
UNITED STATES PATENTS

| 3,188,556 | 6/1965 | Worthington | 324/0.5 |
| 3,360,717 | 12/1967 | Bloom | 324/0.5 |
| 3,469,181 | 9/1969 | Staples | 324/0.5 |

OTHER REFERENCES

P. Hull and J. E. Coolidge– Field Examples of Nuclear Magnetism Logging– Journal of Petroleum Technology– Aug. 1960– pp. 14– 22.

*Primary Examiner*—Michael Lynch
*Attorneys*—William R. Sherman, Donald H. Fidler, Stewart F. Moore and John P. Sinnott ABSTRACT: An illustrative embodiment of the invention discloses a method that identifies gas, oil or water in earth formations penetrated by a borehole. A sample of the fluid drawn from the zone flushed by the mud filtrate adjacent to the borehole is taken to the earth's surface. The sample is subjected to magnetic polarizations which are in a direction that is at right angles to the earth's magnetic field. These polarizations are of various time durations in order to indicate the thermal relaxation time of the sample. The relaxation time identifies the nature of the virgin formation fluid before contamination by the flushing action of the borehole liquid.

INVENTOR.
William E. Youngblood

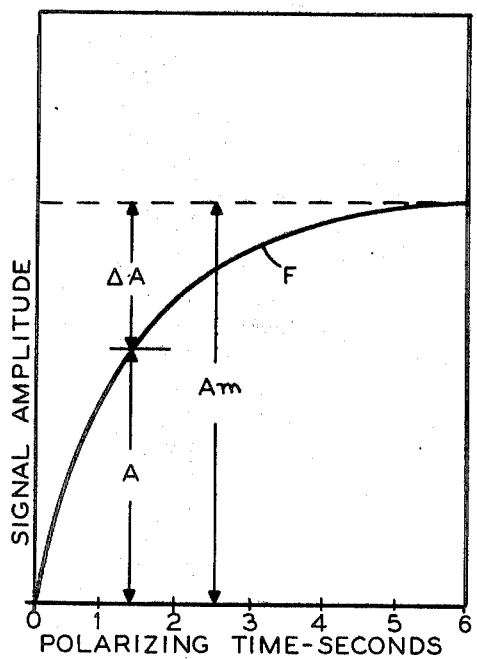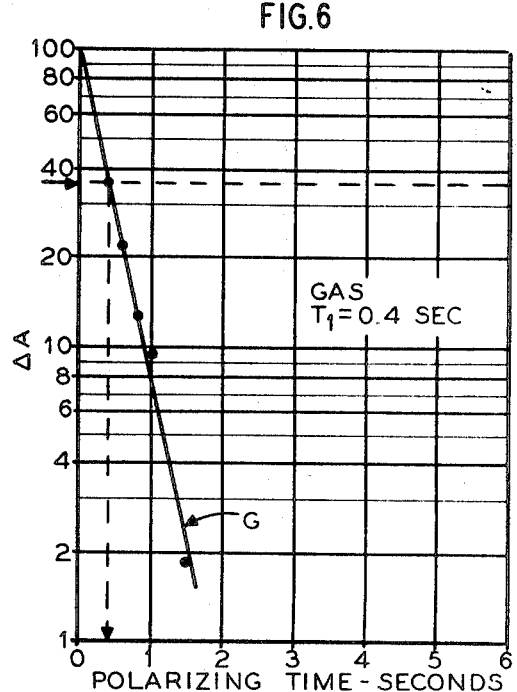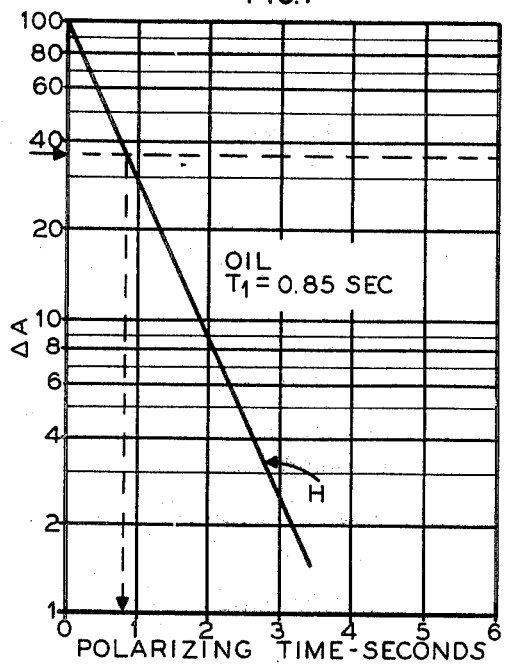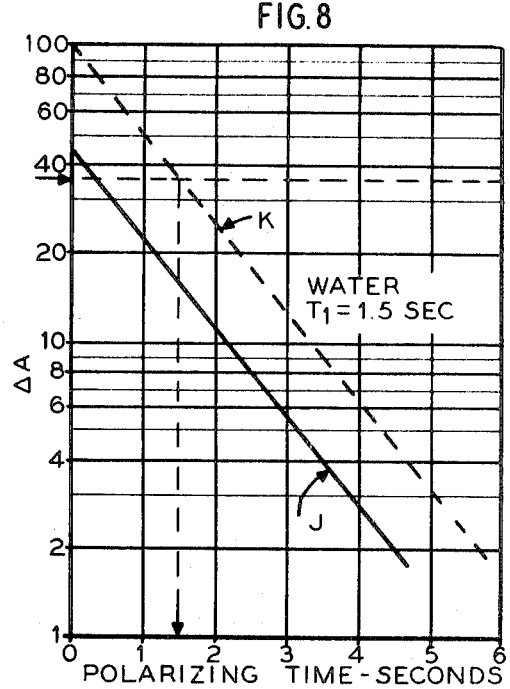

MUD FILTRATE NUCLEAR MAGNETIC ANALYSIS

This is a continuation-in-part of U.S. Pat. application Ser. No. 534,509 filed Mar. 15, 1966 and now abandoned for "Mud Filtrate Nuclear Magnetic Analysis."

This invention relates to methods of investigating earth formations and, particularly, to such methods which involve the taking of a fluid sample from one or more subsurface earth strata.

It is known to lower an instrument into a borehole drilled into the earth and then to use this instrument to obtain a sample of the fluid contained in a particular subsurface earth bed. These instruments are sometimes referred to as "formation testers" or "formation fluid samplers." Typical examples of these instruments are described in U.S. Pat. No. 2,674,313 to Chambers, U.S. Pat. No. 3,011,554 to Desbrandes and Fields, and U.S. Pat. No. 3,104,712 to Whitten.

The formation fluid samples obtained with such instruments are brought back to the surface and subjected to various analysis procedures for purposes of determining the nature and composition of the fluid. If the recovered fluid sample is pretty much the same as the virgin fluid that originally existed in the formation, then the analysis tells what proportions of oil, gas, or water are contained in the formation. Unfortunately, in many cases the recovered fluid sample is, for all practical purposes, nothing more than the filtrate fluid resulting from the flow of fluid from the borehole drilling mud into the earth formation. This may result from relatively deep filtrate invasion into the formation. In such cases, the various analyses heretofore performed would only indicated the presence of mud filtrate. This tells nothing about the nature of the original formation fluids.

It is an object of the invention, therefore, to provide a new and improved method of investigating earth formations which avoids the foregoing limitation.

It is another object of the invention to provide a new and improved method of analyzing formation fluid samples which will provide a definite indication of the nature of the original formation fluid even though most of the recovered sample is only mud filtrate.

In accordance with the invention, there is provided a method of investigating subsurface earth formations for providing indications of the nature of the virgin fluids originally contained in such formations. In practicing this method, there is obtained a sample of the fluid present in the portion of the formation immediately adjacent the borehole. This fluid sample is then analyzed by locating it in the earth's magnetic field and, at the same time, subjecting it to a magnetic polarizing field which is at right angles to the earth's magnetic field. Polarizing fields of various different time durations are used. Shortly following termination of each of these polarizing fields, the amplitude of the electromagnetic signal produced by gyromagnetic precession of the magnetic moments of the protons contained in the fluid sample is measured. These signals for the different polarizing durations are then recorded as a function of the polarizing time duration to provide an indication of the thermal relaxation time of the nuclear phenomena. This thermal relaxation time is then interpreted to determine the primary constituent of the virgin fluid that was in the formation before the borehole was drilled.

For a better understanding of the present invention, together with other and further objects thereof, reference is had to the following description taken in connection with the accompanying drawings, the scope of the invention being pointed out in the appended claims.

Referring to the drawings:

FIG. 5 is a graph used in explaining the nature of the analysis; and

FIGS. 6, 7, and 8 are typical graphical plots that may be obtained with the present method.

Figure 1:
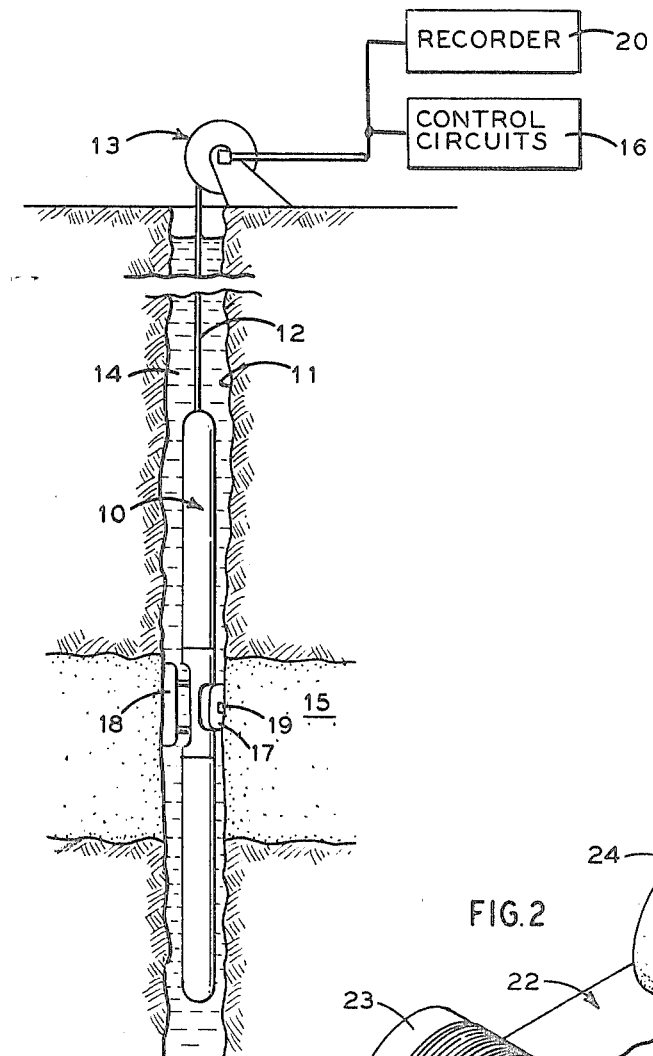
FIG. 1 is a cross-sectional view of a part of the earth showing a formation tester apparatus in the process of obtaining a fluid sample from a subsurface earth formation.

Referring to FIG. 1 of the drawings, there is shown an instrument 10 which is adapted to be lowered into a borehole 11 drilled into the earth, such lowering being performed by means of an armored multiconductor cable 12 suspended from a drum and winch mechanism 13 located at the surface of the earth. The borehole 11 is filled with a fluid 4 commonly referred to as drilling "mud."

The sampling instrument 10 is lowered to the depth of the subsurface formation of interest, in this example a sand formation 15, and is then held stationary at this depth. Various mechanisms within the instrument 10 are then operated by means of control circuits 16 located at the surface of the earth. This causes a pad member 17 and a backup shoe 18 to be extended laterally from the body of the instrument 10 and into engagement with the wall of the borehole 11 on opposite sides of the instrument 10. At the appropriate moment, suitable valves within the instrument 10 are operated to enable the flow of the fluid contained in the formation 15 through a porthole 19 in the pad member 17 into an internal sample chamber contained within the instrument 10. These operations are monitored by means of a recorder 20 located at the surface of the earth.

After the sample chamber is filled, the pad member 17 and the backup shoe 18 are retracted and the instrument 10 is brought back to the surface of the earth. The instrument 10 is then opened and the fluid sample is removed. This fluid sample may then be subjected to the various analysis procedures heretofore utilized.

Figure 2:
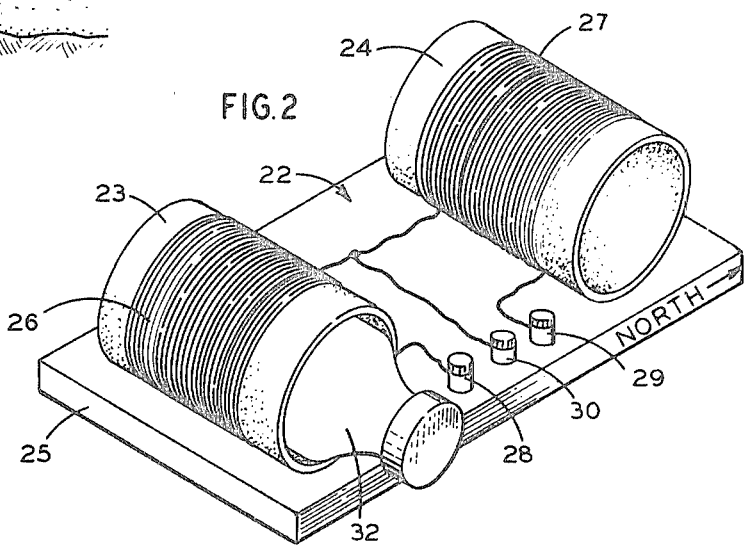
FIG. 2 is a perspective view of a portion of a nuclear magnetism apparatus used in analyzing the formation fluid sample.

Referring now to FIG. 2 of the drawings, there is shown a perspective view of the primary field-generating structure of a nuclear magnetism apparatus 22 which is used in performing the present invention. This apparatus 22 includes a pair of elongated, cylindrical coil support members 23 and 24 which are mounted on a baseboard 25 so that the longitudinal axes of the coil members are parallel to one another. The support member 23 has wound thereon a cylindrical solenoid-type coil 26 composed of many turns of wire. A first lead wire for the coil 26 is connected to a terminal post 28, while a first lead wire for the coil 27 is connected to a second terminal post 29. The second lead wires for the coils 26 and 27 are connected together and to a common terminal post 30.

The coil support member 23 is adapted to receive a nonmagnetic container such as a plastic bottle 32. This bottle 32 is filled with the fluid sample recovered from the subsurface earth formation. It is then placed inside the coil support member 23. The baseboard 25 of the apparatus 22 is then placed in a horizontal position and is rotated until the parallel axes of the coils 26 and 27 are at right angles to the direction of the earth's magnetic field. A compass may be used for achieving this purpose. After this alignment, the coil axes will lie in a magnetic East-West direction with respect to the earth's magnetic field. Preferably, the measurements to be performed are carried out at a location which is relatively quiet from a magnetic field standpoint. Also, the fluid sample which is placed in the bottle 32 should be an unfiltered sample in pretty much the same condition as it was recovered from the earth.

Figure 3:
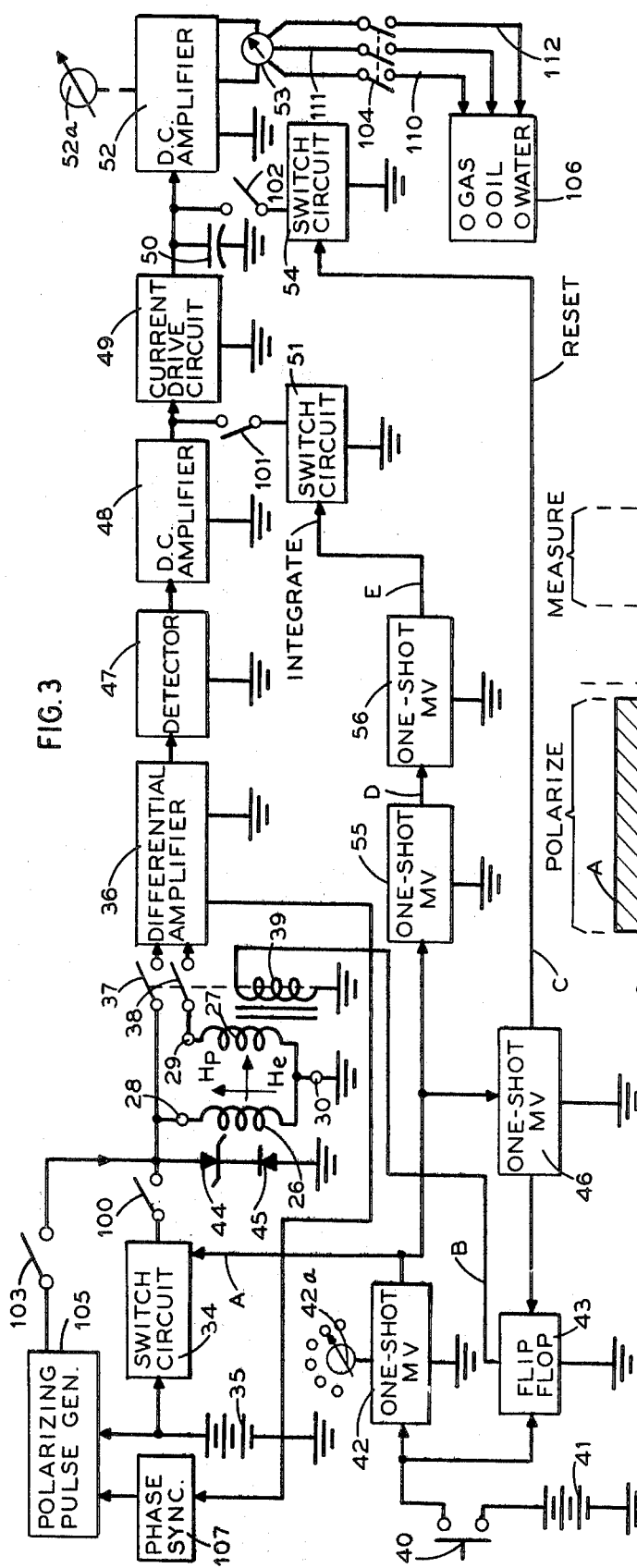
FIG. 3 is an electrical circuit diagram, partly schematic, of electrical energizing and timing circuits which may be used with the FIG. 2 apparatus in performing the method of this invention.

The coil structure apparatus 22 is connected by way of suitable lead wires to the various timing and energizing circuits for operating such apparatus. Representative timing and energizing circuits are shown in FIG. 3 of the drawings. As there seen, the terminal 28 for the sample testing coil 26 into which the fluid-containing bottle 32 is placed is connected by way of a switch circuit 34 to a battery 35. The terminal 28 is also connected to one input terminal of a differential amplifier 36 by way of a relay controlled switch 37. The terminal 29 for the second coil 27 is connected to a second input of the differential amplifier 36 by way of a relay controlled switch 38.

Both switch 37 and switch 38 are controlled by a common relay coil 39. The common terminal 30 for the to coils 26 and 27 is connected to the chassis ground for the timing and energizing circuits.

In order to supply a polarizing current of predetermined duration to the sample testing coil 26, it is necessary to momentarily depress a "start" button 40. This momentarily connects a second battery 41 to the inputs of a one-shot multivibrator 42 and a flip-flop circuit 43. This fires the one-shot multivibrator 42 so that it will produce an output voltage for a predetermined length of time determined by the internal time-constant setting of such multivibrator 42. This time constant may be adjusted to provide different time durations by means of a control knob 42a which controls the selection of the resistor value which is used in the timing circuit of the one-shot multivibrator 42.

Figure 4:
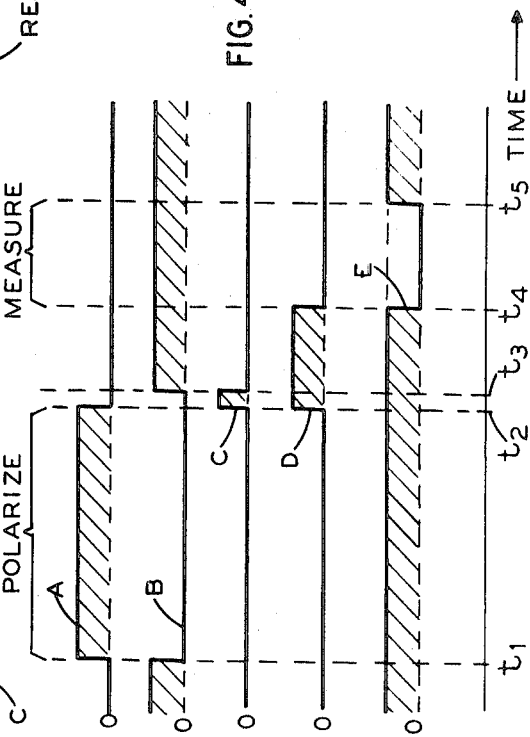
FIG. 4 is a timing diagram used in explaining the operation of the FIG. 3 circuits.

The output voltage from the one-shot multivibrator 42 is supplied to the switch circuit 34 and operates to close the switch 34 and thus connect the energizing battery 35 to the sample testing coil 26. This voltage signal to the switch circuit 34 is represented by waveform A of FIG. 4. With the switch 34 closed, approximately 5 amperes of current flows from the battery 35 and through the coil 26. This produces magnetic polarizing field $H_p$ across the fluid sample which is at right angles to the earth's magnetic field $H_e$. Upon termination of the signal from the one-shot multivibrator 42, the switch 34 opens. The energy stored in the sample testing coil 26 is then rapidly discharged by way of a Zener diode 44 and an ordinary diode 45.

During the foregoing polarizing time, the switches 37 and 38 have been open. As soon as the energy in the coil 26 is dissipated, these switches 37 and 38 are closed so that the nuclear precession signal generated by the protons in the fluid sample may be observed. Switches 37 and 38 are controlled by the relay coil 39. The current supplied to the relay coil 39 is obtained from the flip-flop circuit 43 and is represented by waveform B of FIG. 4. The initial pressing of the button 40 had triggered the flip-flop 43 to discontinue the supplying of current to the relay coil 39. The trailing edge of the signal from the one-shot multivibrator 42 serves to trigger a further one-shot multivibrator 46. This generates a short-duration signal as represented by waveform C of FIG. 4. The trailing edge of this latter signal, occurring at time $t_3$, is used to trigger the flip-flop 43 to drive it back to the condition in which current is again supplied to the relay coil 39. This closes the switches 37 and 38 so that the nuclear precession signal detected by the coil 26 may be supplied to the first input terminal of the differential amplifier 36.

Any "noise" signal picked up by the coil 26 will be balanced out in the input of the differential amplifier 36 by means of an equal "noise" signal picked up by the second coil 27, this latter signal being supplied to the second input terminal of the differential amplifier 36. Thus, the second coil 27 is used to cancel extraneous noise signals such as, for example, momentary extraneous fluctuations in the earth's magnetic field. In this regard, coils 26 and 27 are connected in a series-opposing manner relative to one another and with respect to the inputs of the differential amplifier 36.

The nuclear precession signal induced in coil 26 is an alternating current signal having a frequency of approximately 2.2 kilocycles per second. This signal is amplified by the differential amplifier 36 and then detected by a detector 47 to produce a unidirectional or variable direct current signal having an amplitude proportional to the peak amplitude of the alternating nuclear precession signal. In this regard, the amplifier 36 is preferably a tuned band-pass type of amplifier having its pass band centered at a frequency of 2.25 kilocycles per second, which is approximately the middle of the range of possible values for the frequency of nuclear precession signals for typical values of field strength for the earth's magnetic field.

The direct current signal from detector 47 is amplified by a direct current amplifier 48 and then, at the appropriate time, supplied to a current drive circuit 49. Current drive circuit 49 provides an output current to a condenser 50 which is proportional to the signal voltage supplied to the input of such circuit. The passage of signals between amplifier 48 and current drive circuit 49 is controlled by a switch circuit 51 which is "normally" operative to connect the input of the current drive circuit 49 directly to chassis ground, thus shorting out the input of such circuit and thus preventing any signal from reaching such circuit.

The condenser 50 is used for integration purposes. It develops thereacross a voltage representing the time integral of the current supplied thereto. The voltage across condenser 50 is supplied by way of a second direct current amplifier 52 to an electrical indicating meter 53. The amplifier 52 includes a gain control 52a for purposes of adjusting the full-scale deflection of meter 53.

A switch circuit 54 is used to discharge the condenser 50 and thus to "reset" the integrator represented by the current drive circuit 49 and the condenser 50. Switch circuit 54 is actuated by the signal from the one-shot multivibrator 46 which, as represented by waveform C of FIG. 4, occurs for a brief moment immediately after termination of the polarizing current through the sample testing coil 26.

The purpose of the switch circuit 51 is to enable the condenser 50 to sample and integrate a short piece of the direct current signal from amplifier 48 at a fixed interval of time after the termination of the polarizing current. This purpose is achieved by supplying the signal from one-shot multivibrator 42 to a further one-shot multivibrator 55. The trailing edge of the signal from multivibrator 42, represented at time $t_2$ in FIG. 4, serves to trigger the one-shot multivibrator 55 to produce a voltage signal of approximately 30 milliseconds duration. This signal is represented by waveform D of FIG. 4. This signal is, in turn, supplied to a further one-shot multivibrator 56. The trailing edge of the signal from multivibrator 55, represented at time $t_4$ in FIG. 4, serves to trigger the one-shot multivibrator 56 to produce a further signal of approximately 30 milliseconds duration which is used to turn "off" or "open" the switch 51. This latter signal is represented by waveform E in FIG. 4, the 30 millisecond interval occurring between times $t_4$ and $t_5$.

During the desired 30 millisecond measuring interval occurring between times $t_4$ and $t_5$, the signal from one-shot multivibrator 56 is represented by a zero voltage level. This indicates that the switch 51 will be "off" during this $t_4$–$t_5$ measuring interval. Thus, during the measure interval when switch circuit 51 is "off," the signal at the output of amplifier 48 is effective to drive the current drive circuit 49 to supply current to the condenser 50 to produce across such condenser a voltage representing the integrated signal value over this 30 millisecond measure interval. This integrated signal value may then be observed on the meter 53. One purpose of the integration is to average out any extraneous noise fluctuations that may still be present in the direct current replica of the nuclear precession signal.

Since the lapse of time between the termination of the polarizing current and the beginning of the measure interval is the 30 millisecond time interval ($t_2$–$t_4$) set by the one-shot multivibrator 55, the signal measurement is always made at the same fixed length of time after termination of the polarizing current.

Considering now in greater detail the operative steps in the present method, the fluid sample contained in the bottle 32 is subjected to a polarizing field of a first time duration and the resulting nuclear precession signal is then measured. The fluid sample is then subjected to a polarizing field having a second time duration and the nuclear precession signal is then again measured. This process is repeated for, say, some 12 different polarizing time intervals. Typical polarizing durations that have been found satisfactory are 10, 8, 6, 5, 4, 3, 2, 1.5, 1.0, 0.8, 0.6, and 0.4 seconds. A fixed length of time after each of these polarizing intervals, e.g., 30 milliseconds later, the amplitude of the nuclear precession signal is measured.

These things are readily accomplished by utilizing the timing and energizing circuits shown in FIG. 3. The length of polarizing time is determined by the setting of the control knob 42a associated with the one-shot multivibrator 42. Each polarize-measure cycle is initiated by depression of the pushbutton switch 40 indicated in FIG. 3. The amplitude of the nuclear precession signal is, after appropriate amplification, detection and integration, observed on the meter 53.

The results of these measurements for a typical fluid sample is represented by curve F in the graph of FIG. 5. The relationship between polarizing time and the resulting signal amplitude for any given fluid sample is an exponential function as indicated by curve F. This function may be described mathematically by the equation:

$$A = A_m(1 - e^{1t/T_1})$$

where "$A$" denotes the signal amplitude as read on the meter 53, "$A_m$" denotes the maximum signal amplitude that will be observed for the particular measuring conditions being used, "$t$" denotes time and $T_1$ denotes the time constant for the exponential curve. The factor $T_1$ represents the "thermal relaxation time" for the nuclear precession phenomena. It is the quantity of particular interest in the present method. It is dependent on the type or composition of the fluid being tested.

In order to more readily determine the thermal relaxation time $T_1$, the results of the measurements on a particular fluid sample are plotted on semilogarithmic graph paper of the type indicated in FIG. 6. The horizontal axis of the graph is calibrated linearly in terms of polarizing time, while the vertical axis of the graph is calibrated logarithmically in terms of $\Delta A$ units. As seen from FIG. 5, $\Delta A$ is the difference between the maximum amplitude $A_m$ and the actual amplitude $A$ for any given measurement.

The procedure for measuring a fluid sample is to make a series of initial measurements using increasingly higher values for the polarizing time until values are found which give the maximum amplitude $A_m$. Then, using a polarizing time giving this maximum value $A_m$, the gain control knob 52a for the direct current amplifier 52 is adjusted to provide a full-scale reading on the meter 53. A series of measurements are then made using successively smaller values of polarizing time. The resulting amplitude measurements are recorder and the amplitude differences $\Delta A$ determined. These $\Delta A$ amplitude differences are then plotted as a function of polarizing time on semilog graph paper of the type represented in FIG. 6.

The thermal relaxation time $T_1$ is then determined from the resulting curve, for example, curve G of FIG. 6 by determining the time corresponding to a $\Delta A$ value of $1/e$. The value of $1/e$ is 0.37. Assuming that a value of 100 corresponds to full-scale meter deflection, then the time value for a $\Delta A$ value of 37 is the desired thermal relaxation time $T_1$. This results from the fact that for a time value of $t=T_1$, the normalized amplitude difference $\Delta A$ is equal to $1/e$.

It has been found that thermal relaxation time measurements made on fluid samples obtained from subsurface earth formations give positive indications of whether the subsurface formations contained gas, oil or water. It has been found that this result is obtained even though the fluid sample contains no measurable traces of either gas or oil. Many measurements on many fluid samples obtained from oil wells located in the southern region of the State of Texas indicate that the relationship between $T_1$ and the nature of the virgin fluid contained in the formation is as follows:

| $T_1$ Range | Fluid |
| --- | --- |
| 0.1–0.6 seconds | Gas |
| 0.6–1.2 seconds | Oil |
| 1.2–2.5 seconds | Water |

These results have been confirmed by the subsequent production obtained from tested formations after completion of the oil wells associated with such formations.

As indicated in the graph of FIG. 6, the fluid sample which produces curve G has a thermal relaxation time of 0.4 seconds. This indicates that this fluid sample was obtained from a subsurface earth formation that originally contained gas and this, even though no gas may have been recovered from the fluid sample. It should be remembered that, during the drilling of the oil well, filtrate from the drilling mud invades laterally into the earth formation pushing back the virgin fluid contained therein. If this invasion is relatively deep, then the virgin fluid is pushed rather far back and as a consequence when the fluid sample is obtained, it will sometimes be the case that none of the virgin fluid is able to make it back to the formation testing instrument and thus none is recovered. Nevertheless, the present method produces an indication of the nature of this virgin fluid.

The fluid sample which produced curve H shown in the graph of FIG. 7 is seen to have a thermal relaxation time $T_1$ of 0.85 seconds. This indicates that this fluid sample was obtained from a subsurface earth formation for which the virgin fluid was oil.

The graph of FIG. 8 represents the case where the virgin fluid is conate formation water. FIG. 8 also illustrates a procedure that may be used where, for one reason or another, the meter 53 is not adjusted to provide full-scale deflection for the maximum signal amplitude $A_m$. In this example, the curve obtained from plotting the $\Delta A$ values against the polarizing time values is represented by curve J. In order to read off the $T_1$ value, it is necessary to normalize this curve. This is done by drawing a second curve K running parallel to curve J but passing through the 100 percent point at zero time. $T_1$ is then determined by noting for the case of curve K the time value for a $\Delta A$ value of $1/e$, that is, a value of 37.

The above data has been extensively verified for oil well boreholes in the southern region of the State of Texas. This same method should be equally applicable to other regions of the U.S. though, in such cases, it may be necessary to adjust somewhat the ranges for the $T_1$ values given in the above table to take into account particular local conditions. In particular, the results appear to be somewhat dependent on the chemical composition of the drilling mud. This is important since different mud compositions are frequently used in different geographical regions in order to satisfy particular local conditions. The results are also believed to be somewhat dependent on the nature of the virgin or connate formation water, which also varies somewhat from one geographical region to another.

Turning once more to FIG. 3, circuit elements well known in the art art selectively coupled to the equipment hereinbefore described in order to provide an automatic output signal that indicates the presence of gas, oil or water in accordance with the foregoing thermal relaxation time criteria. For example, switches 100, 101 and 102 are operated in order to disconnect, respectively, the switch circuits 34, 51 and 54 from the system. Switch 103 and a triple pole single throw switch 104 also are manipulated to connect, respectively, a polarizing pulse generator 105 and formation fluid indication lamps 106 to the FIG. 3 circuit.

In operation, the polarizing pulse generator 105 produces a train of output pulses. Each of these output pulses has a duration that is substantially less than any expected value of $T_1$. The pulses excite the fluid sample protons within the coil 26 in order to produce nuclear magnetic precession signals in the manner described above. The precession signal current induced in the coil 26 is applied through the differential amplifier 36, the detector 47, the direct current amplifier 48, the current drive circuit 49 and the amplifier 52 to the meter 53 in order to produce a direct current signal indication that is directly related to the thermal relaxation time, $T_1$.

Preferably, for automatic operation, the meter 53 is a relay meter capable of operating limit switches in accordance with the magnitude of the applied electrical signal. Thus, for instance, the limit switches on the meter 53 are set to complete the circuit through conductors 110, 111 or 112 in order to energize the gas, oil or water lamp at the indication 106 in response to the specific thermal relaxation time measured in the foregoing circuit. In this manner one of the three lamps for gas, oil or water is automatically illuminated to show the character of the fluids in the earth formation under consideration, as established through the foregoing schedule of thermal relaxation time values.

A phase synchronism circuit 107 couples the pulse generator 105 to the differential amplifier 36 in order to phase properly the polarizing pulses with the observed precession signals. Appropriate ground connections are provided for the circuit elements under consideration.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of investigating subsurface earth formations traversed by a borehole for providing indications of the nature of the virgin fluid originally contained in such formations comprising: obtaining a sample of the fluid present in the portion of the formation immediately adjacent the borehole after at least some of the virgin fluid has been displaced therefrom; withdrawing the sample from the borehole; subjecting the fluid sample to a undirectional magnetic polarizing field directed at an angle to the earth's magnetic field for a predetermined time duration; sensing nuclear precession of fluid protons of the sample following the termination of the polarizing field to produce an alternating precession signal; repeating the subjecting and sensing steps to produce a succession of spaced precession signals; detecting, amplifying and integrating said spaced precession signals to produce an output signal of a magnitude which is representative of the thermal relaxation time of said protons; displaying the magnitude of said output signal; and automatically comparing said output signal with predetermined signal values representative of known relaxation times to indicate the nature of the virgin fluid according to the following relations:

| Thermal Relaxation Time Range | Fluid |
| --- | --- |
| 0.1–0.6 seconds | Gas |
| 0.6–1.2 seconds | Oil |
| 1.2–2.5 seconds | Water |